Oct. 20, 1959 J. O. EDSON 2,909,675

BISTABLE FREQUENCY DIVIDER

Filed May 10, 1955 2 Sheets-Sheet 1

INVENTOR
J. O. EDSON
BY W. L. Keefauver
ATTORNEY

Oct. 20, 1959 J. O. EDSON 2,909,675

BISTABLE FREQUENCY DIVIDER

Filed May 10, 1955 2 Sheets-Sheet 2

INVENTOR
J. O. EDSON
BY W. L. Keefauver
ATTORNEY

United States Patent Office 2,909,675

Patented Oct. 20, 1959

2,909,675

BISTABLE FREQUENCY DIVIDER

James O. Edson, Oxford, N.J., assignor to Bell Telephone Laboratories, Incorporated, New York, N.Y., a corporation of New York Application May 10, 1955, Serial No. 507,280

6 Claims. (Cl. 307—88.5)

This invention relates to circuits for generating an output wave with a fundamental frequency which is an integral submultiple of the frequency of the driving voltage. More particularly this invention relates to frequency-dividing circuits which use pulse-forming regenerative circuits.

In the field of frequency dividers it is well known to use either free-running or monostable multivibrators to divide by various ratios. If a free-running multivibrator is used, it is not possible to predict the phase relationship in which such a circuit will start to generate the submultiple frequency. It is also difficult to detect a failure in the synchronizing source because the frequency divider simply operates independently after such a failure. If a monostable multivibrator is used as a frequency divider the circuit must be made unsymmetrical in order to cause the multivibrator to favor a particular submultiple of the driving frequency, and this results in an output waveform that is unsymmetrical in that the on time and off time are not equal.

It is therefore an object of this invention to increase the range of division ratios for bistable-frequency dividers.

Another object of this invention is to control the operation of a frequency divider so that it can be turned on in a predetermined phase relation.

It is a further object of this invention to improve the wave shape of the voltage output from a frequency-divider circuit.

These objects are accomplished in one embodiment of this invention by employing a symmetrical, bistable, transistor multivibrator to divide the frequency of a driving voltage by an odd integral division factor to obtain an integral submultiple frequency. The multivibrator comprises two transistors with resistance-capacitance networks regeneratively cross-coupling the collector electrode of each transistor to the base electrode of the other transistor.

Two series of periodically recurring pulses of opposite phase are derived from a single driving voltage wave of a predetermined frequency. The two series of pulses are each applied to the base electrodes of a different one of the transistors to trigger that one transistor into conduction. A voltage is coupled from the collector electrode of that one transistor to the base electrode of the other transistor via the corresponding cross-coupling network to hold the other transistor nonconducting and insensitive to the triggering pulses applied thereto for *n* half cycles of the driving voltage after the triggering of that one transistor, *n* being the odd integral frequency division factor. There is thus produced at each collector electrode a voltage wave having a frequency which is an integral submultiple of the driving voltage frequency. A gating device is connected to control the supply of pulses to at least one of the transistors to permit the frequency divider to be stopped and started in a determinable state of conduction with respect to a predetermined time reference.

One feature of this invention is that, since pulses are used to trigger the regenerative circuit, great flexibility is possible in assigning values to the impedances which make up the cross-coupling circuits because a bistable circuit will not change its conduction condition until the circuit is triggered.

It is another feature of this invention that frequency divisions by either odd or even integers can be accomplished while still maintaining a symmetrical output voltage waveform.

The arrangement and operation of this invention, as well as additional features thereof, will be apparent from an examination of the following specification, including the claims, and the drawings in which Fig. 1 is a block diagram of an arrangement used to help illustrate the invention.

Figure 1:
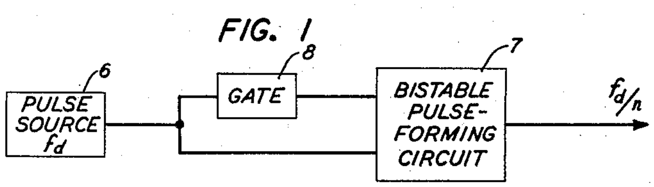

A generalized circuit of one embodiment of the invention is shown in Fig. 1. This circuit includes a source 6 of pulses recurring at a frequency $f_d$ and a bistable, pulse-forming circuit 7. A gating device 8 is arranged in one of the leads connecting the source 6 to the bistable circuit 7. The bistable circuit transfers from one of its stable states to the other in response to the pulses from source 6, and it is arranged to be non-responsive to certain of the pulses so that the frequency of the output of the bistable circuit will be an integral submultiple of the driving frequency. For any particular frequency of the output waveform the portions of each cycle above and below the average value of the output voltage can be of the same shape and enclose equal areas, or a predetermined amount of dissymmetry can be injected.

Figure 2:
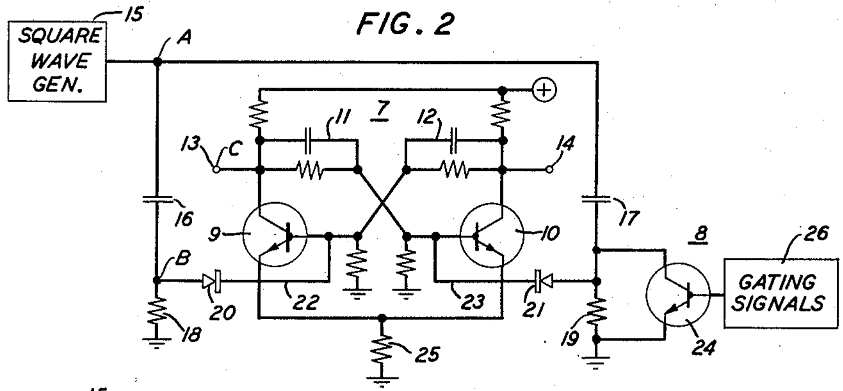
Fig. 2 is a schematic diagram of one embodiment of this invention.

Referring to Fig. 2, the pulse-forming circuit shown in the illustrative embodiment of this invention is a symmetrical, bistable multivibrator. Any suitable translating devices such as transistors 9 and 10 may be employed in the multivibrator circuit. Transistors 9 and 10 are regeneratively cross-coupled by capacitive cross-coupling circuits 11 and 12. The time constants of cross-coupling circuits 11 and 12 determine what frequency will be available at either of the output terminals 13 and 14 of the multivibrator, and these time constants also determine the conditions of symmetry as will be later explained.

The pulse source chosen to illustrate this embodiment of the invention comprises a square-wave generator 15, two differentiating circuits connected to the output of generator 15 and including, for illustration purposes, capacitors 16 and 17 and resistors 18 and 19, and one of the diodes 20 and 21 connected in series with the output of each of the differentiating circuits. It should be understood however that a variety of configurations for the pulse source are well known in the art and could be applied here with equal facility. The important factor is that pulses of a determinable polarity must be applied to each side of multivibrator 7.

Input leads 22 and 23 are provided to connect the output of the pulse source to transistors 9 and 10 of multivibrator 7. Leads 22 and 23 have been shown as connected to the base terminals of transistors 9 and 10, but many different connections are possible. The particular method used will depend upon the type of translating device which is employed and the polarity of the pulses which are made available to the multivibrator through diodes 20 and 21. The potential drop across resistor 25, connected in series with both emitter electrodes, holds the emitter electrodes above ground potential so that the base electrodes can be biased to a less positive potential than their respective emitters without being below ground potential.

In order to control the phase relation in which multivibrator 7 stops and starts suitable gating means 8 are provided. Gate 8 has been shown in Fig. 2 as comprising an electronic switch, such as transistor 24, driven by a source of gating signals 26. The emitter-collector circuit of transistor 24 is connected across resistor 19 of the differentiating circuit which supplies transistor 10 with triggering pulses. Of course there are many ways in which gate 8 could be connected to control the supply of pulses to multivibrator 7. For example, gate 8 could be connected to the other differentiating circuit or gates could be connected to both differentiating circuits.

The operation of transistor 24 as an electronic switch is explained in detail in the copending application of P. A. Reiling, Serial No. 410,924, filed February 17, 1954. Briefly, transistor 24 is normally biased beyond cutoff and a relatively high impedance, of the order of one to two megohms, appears between its emitter and collector terminals. When a voltage of sufficient magnitude to drive transistor 24 to saturation is applied to the base terminal, the impedance between the emitter and collector terminals decreases rapidly to a level that approximates a short circuit, about one to five ohms.

Figure 4:
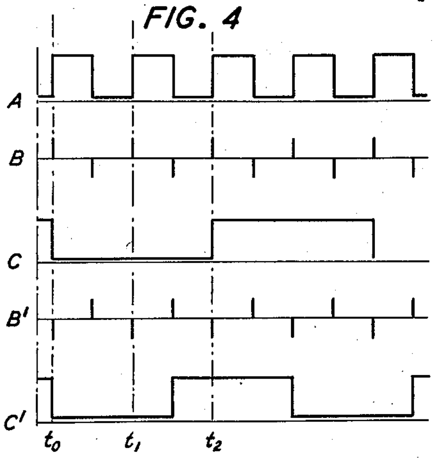
Fig. 4 is a series of voltage wave shapes illustrating the operation of the embodiments of Figs. 2 and 3.

The operation of the embodiment of Fig. 2 will be apparent from an examination of the waveforms of Fig. 4 in which the waveforms designated A, B and C represent the voltages appearing at the correspondingly designated points in the circuit of Fig. 2. Thus, for example, in order to accomplish division by an even integer such as four, the time constants of cross-coupling circuits 11 and 12 must be of such magnitude as to hold multivibrator 7 in each of its states of conduction for at least two half cycles of the driving frequency but to assure triggering at four half cycles. Or, stated differently, multivibrator 7 is held in each conduction state for a time, T expressed in half cycles of the driving voltage, where $n>T>n-2$, and $n$ is a number of half cycles of the driving voltage equal to the integer representing the division factor.

The driving voltage A is supplied by generator 15, and it appears at the output of the differentiating circuits as a series of alternate positive and negative pulses, B, with pulses of like polarity recurring at a rate equal to the frequency of the driving voltage. Diodes 20 and 21 select pulses of the proper polarity, positive in this case, and these are conducted over leads 22 and 23 to transistors 9 and 10. These pulses cause conduction to be transferred back and forth between transistors 9 and 10, at a rate determined by the time constants of circuits 11 and 12, to produce at output terminal 13 a voltage having the wave shape C. A similar voltage will appear at terminal 14 180 degrees out of phase with the voltage C.

Assuming that transistor switch 24 of gate 8 is open and that conduction was transferred to transistor 9 at a time $t_0$, the next following pulse reaches the transistors at time $t_1$. This pulse has no appreciable effect on transistor 9 because it is already conducting. It also has no effect on transistor 10 because it is cut off and held in that condition by bias applied to the base terminal thereof by the charge on the capacitor in coupling circuit 11.

At time $t_2$, a second pulse reaches the transistors. Transistor 9 is unaffected, as before, because it is still conducting. By this time the charge on the capacitor in coupling circuit 11 has decayed sufficiently so that the second pulse triggers transistor 10 into conduction and causes transistor 9 to be biased beyond cutoff. Transistor 10 then continues to conduct until the positive pulse occurring after the next two half cycles of the driving voltage, at which time conduction is transferred back to transistor 9 in a similar manner. Thus, in dividing by four, the nonconducting transistor is biased far enough beyond cutoff to prevent triggering before or at $n-2$ half cycles of the driving voltage but to assure triggering at $n$ half cycles. It can be seen from Fig. 4 that higher division ratios are possible in a similar manner by adjusting the time constants of coupling circuits 11 and 12. In each case where the output is symmetrical, the time that each transistor is assuredly biased beyond cutoff can be described by the following expression:

$$n>T>n-2$$

where T is the time expressed in half cycles of the driving voltage that each transistor is held cutoff and $n$ is an integral number of half cycles of the driving voltage equal to the division factor. It is also evident from Fig. 4 that the on and off times of the output wave will be equal if the time constants of circuits 11 and 12 are approximately equal.

When power was initially applied to bistable multivibrator 7, either one of the transistors may have started to conduct and driven the other one into its cutoff condition. However, when transistor switch 24 of gate 8 is closed multivibrator 7 ultimately rests with transistor 9 conducting because no more pulses can reach transistor 10 to trigger it into conduction. Thereafter, if transistor 9 has been conducting for at least $n-2$ half cycles of the driving voltage, transistor 10 is triggered into conduction by the first positive pulse to reach it after transistor switch 24 is opened.

When it becomes necessary to stop the frequency divider in accordance with the gating signal, the supply of triggering pulses to transistor 10 is cut off by transistor 24. If transistor 10 was conducting at that time, the conduction is subsequently transferred to transistor 9 as described above. If transistor 9 was conducting, it continues to conduct until the supply of trigger pulses to transistor 10 is restored. At that time transistor 10 is triggered by the first positive pulse, provided transistor 9 had been conducting for at least $n-2$ half cycles of the driving voltage. Thus, if only one transistor of multivibrator 7 is gated, that is the one to which conduction is transferred on the first transfer following the opening of gate 8. Likewise, if both transistors are gated, the one which was conducting when the gate closed will still be conducting when the gate opens because the gate prevents additional pulses from reaching multivibrator 7 to transfer conduction. A failure of the pulse source has the same effect as gating the multivibrator in both input leads. The failure is immediately apparent because the multivibrator output is then a steady D.-C. voltage.

Figure 3:
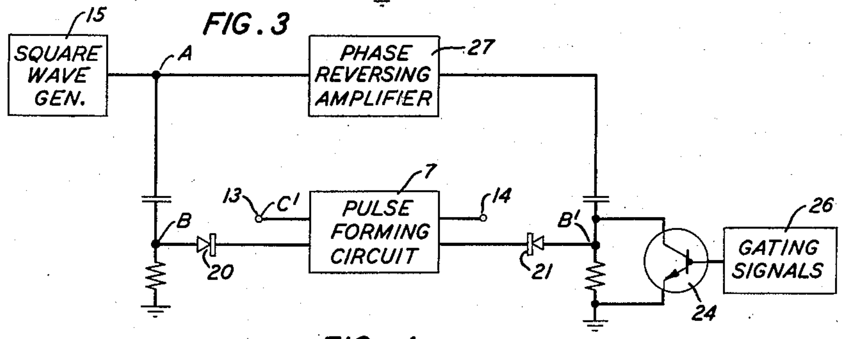
Fig. 3 is a modification of the circuit of Fig. 2 suitable for frequency division by odd integers.

The frequency divider as described up to this point will only divide by even integers. Fig. 3 illustrates a frequency divider suitable for division by odd integers. This frequency divider is similar to that in Fig. 2 except that a phase reversing device, such as the amplifier 27, is inserted in the circuit leading to one of the transistors of multivibrator 7. Amplifier 27 causes the two parts of multivibrator 7 to be alternately supplied with triggering pulses of like polarity. This method of triggering favors the generation of submultiple frequencies that are odd subharmonics as is well known in connection with astable frequency dividers.

In Fig. 4, B′ is the voltage appearing at a point B′ in Fig. 3 before passing through diode 21 to transistor 10 in the pulse forming circuit 7. C′ is the output voltage appearing at terminal 13, and it represents the voltage waveform A with the frequency thereof divided by three. The voltage at terminal 14 has a similar configuration and is 180 degrees out of phase with the voltage C′. It is apparent from Fig. 4 that the relation $n>T>n-2$, demonstrated above for division by even integers, also applies to division by odd integers. Thus, for division by three, the coupling circuits must hold the nonconducting transistor insensitive to triggering for more than one half cycle of the driving voltage after the conducting transistor was triggered but susceptible to triggering at three half cycles after the conducting transistor was triggered.

The frequency available in output terminal 13 or 14 depends upon the time constants of circuits 11 and 12, the frequency of generator 15, and whether transistors 9 and 10 are alternately or simultaneously supplied with trigger pulses. Regardless of the frequency available, however, gate 8 permits frequency division to be started in a predetermined phase relation with respect to the gating signal.

Figure 5:
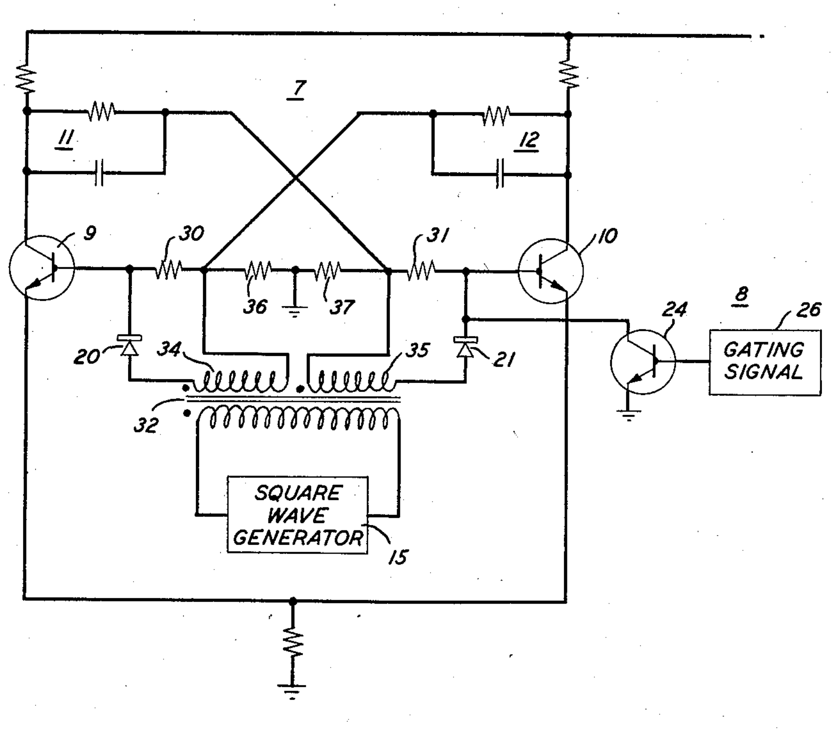
Fig. 5 is a schematic diagram of another embodiment of this invention suitable for division by odd integers.

Referring to Fig. 5 there is illustrated an embodiment of the invention wherein inductive differentiating means such as the transformer 32 is provided to convert the output of square-wave generator 15 to positive and negative pulses. Resistors 30 and 31 have been added to the cross-coupling circuits 12 and 11 adjacent to the base electrodes of transistors 9 and 10, respectively, to provide impedance across which input pulses may be applied. Secondary windings 34 and 35 are connected in parallel with resistors 30 and 31, respectively. Diodes 20 and 21 are still connected to the base terminals of transistors 9 and 10, respectively, to permit pulses of a single polarity to reach the respective base terminals. The resistors 36 and 37 provide a discharge path to ground for the capacitors of the cross-coupling circuits 11 and 12.

Gate 8 is here connected to the base of transistor 10. Thus, the opening of transistor switch 24 of gate 8 permits the frequency divider to operate in the same manner as described above in connection with either Fig. 2 or Fig. 3. If transistor switch 24 is closed, transistor 24 shunts pulses away from resistor 31 and transistor 10 so that multivibrator 7 rests with transistor 9 conducting.

The circuit of Fig. 5 favors odd submultiple frequencies with the winding polarities as indicated by the dots adjacent each winding. The circuit can be made to favor even submultiples by reversing either winding 34 or winding 35.

Dissymmetry can be inserted in the output of any of the embodiments by proportioning the time constants of cross-coupling circuits 11 and 12 to permit conduction transfers at the desired half cycle points. Of course, a phase-reversing device is required if a conduction transfer is to take place after an odd number of half cycles of the driving voltage even though the total division ratio may be an even number.

It is understood, of course, that although this invention has been explained in connection with frequency division by three or four the invention is equally applicable to division by other factors, both even and odd. Similarly it should be apparent that although particular circuit arrangements have been utilized to illustrate this invention it is not intended to be limited to the forms illustrated since many variations which are within the scope of the invention will be obvious to those skilled in the art.

What is claimed is:

1. In a circuit for generating voltages at a frequency which is an integral submultiple of the frequency of a driving voltage and in a predetermined phase under the control of a gating signal, a symmetrical bistable multivibrator comprising two wave translating devices each having an input circuit and an output circuit, circuit means for cross-coupling the respective input and output circuits of said translating devices, said multivibrator having two stable conduction conditions in each of which a different one of said translating devices is conducting while the other translating device is cut off, a driving voltage generator of a predetermined frequency, circuit means for connecting the output of said generator to both of said translating device input circuits to trigger said multivibrator from either one of said stable conditions to the other thereby producing output voltages of equal amplitude and opposite phase in said translating device output circuits respectively, said last-mentioned circuit means comprising separate resistor-capacitor differentiating means connected to each of said translating device input circuits, separate rectifying means connected between each of said differentiating means and one of said translating device input circuits, phase reversing means connected between said generator and one of said translating device input circuits, and gating means connected to one of said translating device input circuits for controlling said predetermined phase with respect to said gating signal of said output voltages produced in said last-mentioned output circuits, said gating means comprising an electronic switch connected in parallel with the resistor in one of said differentiating means, said cross-coupling means having time constants of such magnitude that the transfer of conduction to either of said translating devices from the other translating device is restrained for a time period equivalent to that of at least $n-2$ half cycles but not more than that equivalent to $n$ half cycles of the driving voltage after the initiation of conduction in said last-mentioned other translating device, $n$ being an integer greater than 1.

2. The voltage generating circuit according to claim 1 in which said gating means comprises a transistor switch having base, emitter and collector electrodes and having a high and a low internal impedance condition between its emitter and collector electrodes, means connecting the internal emitter-collector circuit of said transistor in parallel with one of said differentiating means resistors, and a source of gating signals to bias said transistor in either its high or its low impedance condition.

3. A frequency divider comprising first and second transistors each having at least a base and a collector electrode, means for connecting said transistors in a bistable multivibrator circuit, said last-mentioned means including impedances for regeneratively cross-coupling said collector and base electrodes of the respective transistors whereby said multivibrator has a different stable state corresponding to conduction in each one of said transistors with the other transistor cut off, said cross-coupling means comprising a separate resistance connected from the base of each transistor to the collector of the other transistor and a separate capacitor connected in parallel with a portion of each of said resistors adjacent its respective collector connection, means for differentiating a voltage wave comprising a transformer having a primary winding and two secondary windings, means for applying a driving voltage wave of a predetermined frequency to said primary winding whereby voltage impulses corresponding to the differentiated driving voltage are produced in said secondary windings, two diodes, means connecting a portion of each of said cross-coupling resistors adjacent its base connection in a separate closed loop circuit including one of said diodes and one of said secondary windings whereby said differentiated voltage impulses are applied to said base electrodes, said diodes being poled to conduct current in the same direction in each of said loops with respect to its associated transistor, said secondary windings being poled for contraphasal application of said impulses to their respective closed loop circuits to trigger said transistors alternately, a source of gating signals, and an electronic switching device responsive to said gating signals and connected to one of said loops to block the transmission of said pulses therethrough, the time constant of each of said cross-coupling circuits being of such magnitude that each of said transistors is rendered insensitive to triggering for a predetermined number of half cycles of said driving voltage wave after the other transistor has been triggered.

4. The frequency divider according to claim 3 in which said electronic switching device comprises a transistor having base emitter and collector electrodes and having a high and a low internal impedance condition between its emitter and collector electrodes, means connecting the internal emitter-collector circuit of said transistor to one of said loops, means for biasing said transistor to its high impedance condition in the absence of a signal from said gating source, and means for applying a signal from said gating source to said switching device base electrode to actuate said switch to its low internal emitter-collector impedance condition.

5. In a circuit for generating voltages at a frequency which is an integral submultiple of the frequency of a driving voltage, a multivibrator comprising two wave translating devices each having an input circuit and an output circuit, individual circuit means for cross-coupling the output circuit of each of said devices to the input circuit of the other of said devices, said multivibrator having two stable conduction conditions in each of which a different one of said translating devices is conducting while the other translating device is cut off, a source of driving voltage of a predetermined frequency, first and second resistors connected in series in said cross-coupling circuit means, respectively, means including a transformer having a primary winding and two secondary windings for differentiating said driving voltage, means for applying said driving voltage to said primary winding whereby voltage impulses corresponding to the differentiated driving voltage are produced in said secondary windings, two diodes, means connecting each of said first and second resistors in a separate closed loop circuit including one of said diodes and one of said secondary windings whereby said differentiated driving voltage impulses are applied to said input circuits, said diodes and secondary windings being poled for applying said impulses to said first and second resistors for triggering said devices alternately, said cross-coupling means having time constants of such magnitude that the transfer of conduction to either of said translating devices from the other translating device is restrained for a time period equivalent to at least $n-2$ half cycles, but not more than a time period equivalent to $n$ half cycles, of the driving voltage after the initiation of conduction in said other translating device, $n$ being an integer greater than 1.

6. In a circuit for generating voltages at a frequency which is an integral submultiple of the frequency of a driving voltage, a multivibrator comprising two wave translating devices each having an input circuit and an output circuit, circuit means for cross-coupling the input and output circuits of said translating devices, said multivibrator having two stable conduction conditions in each of which a different one of said translating devices is conducting while the other translating device is cut off, a driving voltage generator of a predetermined frequency, circuit means for coupling the output of said generator to each of said translating device input circuits at different times to trigger said multivibrator from either one of said stable conditions to the other, the last-mentioned circuit means comprising means for differentiating said generator output, and rectifiers for selecting and applying to each of said devices predetermined portions of the output of said differentiating means, gating means comprising an electronic switch connected in shunt with respect to the input circuit of at least one of said devices, a source of gating signals having a predetermined phase relation with respect to said driving voltage, means for actuating said electronic switch in response to said gating signals for by-passing voltages in such input circuit around said one device thereby holding said multivibrator in a predetermined one of said stable conditions, and said cross-coupling means having time constants of such magnitude that the transfer of conduction to either of said translating devices from the other translating device is restrained for a time period equivalent to at least $n-2$ half cycles but not more than a time period equivalent to $n$ half cycles of the driving voltage after the initiation of conduction in said other translating device, $n$ being an integer greater than 1.

References Cited in the file of this patent

UNITED STATES PATENTS

| | | |
|---|---|---|
| 2,399,135 | Miller et al. | Apr. 23, 1946 |
| 2,589,465 | Weiner | Mar. 18, 1952 |
| 2,644,887 | Wolfe | July 7, 1953 |
| 2,723,080 | Curtis | Nov. 8, 1955 |

FOREIGN PATENTS

| | | |
|---|---|---|
| 514,940 | Great Britain | Nov. 22, 1939 |

OTHER REFERENCES

Electronics, February 1947, pages 121 to 123, Tachometric Audio-Frequency Meter," Kasner.